US012371936B2

(12) United States Patent
Asjes

(10) Patent No.: US 12,371,936 B2
(45) Date of Patent: Jul. 29, 2025

(54) ADVANCED MODULAR SLIDING (AMS) DOOR SYSTEM

(71) Applicants: Oahu B.V., Bolsward (NL); Ventura Systems C.V., Bolsward (NL)

(72) Inventor: Hilbrand Hans Asjes, Bolsward (NL)

(73) Assignees: Oahu B.V., Bolsward (NL); Ventura Systems C.V., Bolsward (NL)

(*) Notice: Subject to any disclaimer, the term of this patent is extended or adjusted under 35 U.S.C. 154(b) by 0 days.

(21) Appl. No.: 18/576,401

(22) PCT Filed: Jul. 12, 2022

(86) PCT No.: PCT/EP2022/069477
§ 371 (c)(1),
(2) Date: Jan. 4, 2024

(87) PCT Pub. No.: WO2023/285468
PCT Pub. Date: Jan. 19, 2023

(65) Prior Publication Data

US 2024/0309689 A1 Sep. 19, 2024

(30) Foreign Application Priority Data

Jul. 12, 2021 (NL) ..................................... 2028697

(51) Int. Cl.
*E05D 15/10* (2006.01)

(52) U.S. Cl.
CPC ..... *E05D 15/1068* (2013.01); *E05D 15/1007* (2013.01); *E05Y 2900/51* (2013.01)

(58) Field of Classification Search
CPC ............ E05D 15/1068; E05D 15/1007; E05D 15/1005; E05D 15/1065; E05D 15/1086; E05D 15/1001; E05D 15/1044
See application file for complete search history.

(56) References Cited

U.S. PATENT DOCUMENTS

2008/0231083 A1* 9/2008 Smink ................ E05D 15/1081
296/202
2018/0087303 A1* 3/2018 Kohler ................... E05F 15/50

FOREIGN PATENT DOCUMENTS

EP 0 466 719 B1 6/1994
GB 1464992 * 5/1974

* cited by examiner

*Primary Examiner* — Marcus Menezes
(74) *Attorney, Agent, or Firm* — Hoffmann & Baron, LLP

(57) ABSTRACT

A sliding door system includes a support guidance for suspending a door leaf with respect to a framework. A steering track is fixed to the framework and an engaging front lever is mounted at a front edge of the door leaf. The support guidance is arranged independent from a steer guidance which provides a design freedom in which a rigidity of the support guidance can be increased independent from the steer guidance. The steer guidance can be designed with a compact configuration. A mechanical chain of connections of the door leaf to the swing shaft can be made more robust by adapting at least one of a slide bar, a sliding carriage and a swing arm, such that a substantial support of the door leaf is provided by this mechanical chain of connections.

14 Claims, 6 Drawing Sheets

ADVANCED MODULAR SLIDING (AMS) DOOR SYSTEM

CROSS REFERENCE TO RELATED APPLICATIONS

This application is a U.S. National Phase filing of International Application No. PCT/EP2022/069477, filed on Jul. 12, 2022, designating the United States of America, claiming priority to and the benefit of the Dutch application NL2028697, the entire contents of which are incorporated by reference.

FIELD OF THE INVENTION

The invention relates to a sliding door system, in particular a vehicle sliding door system for transport vehicles, like a van, a railway train or a bus car, comprising a framework and at least one door leaf having a front edge and a rear edge. The door leaf is displaceable relative to the framework by a sliding motion in a transversal direction of the door leaf from a closed position to an open position to provide a doorway in the framework. The door leaf is suspended from the framework by a support guidance. The support guidance comprises a swing shaft with a swing arm which swing shaft is swingable about a swing axis to enable a plug out motion of the door leaf relative to the framework. The support guidance comprises a slide bar which extends in the transversal direction of the door leaf and which slide bar is mounted to the door leaf. The support guidance comprises a sliding carriage slidably mounted to the slide bar and pivotally about a carriage pivot axis connected to a distal end of the swing arm. The sliding door system further comprises a steer guidance for guiding the sliding motion of the door leaf. The steer guidance includes a steering track extending in the transversal direction and in which the front edge of the door leaf is coupled to the steering track by a front lever.

BACKGROUND

EP0466719 discloses a device for opening and closing a door in railway and bus cars. The device has a structure which comprises an rotatable ejection drive assembly and a translation guide. The ejection drive assembly comprises a lower and upper ejection drive arm joined at their base ends at an axis of rotation. At a free end of each ejection drive arm, a clamp carrying a pivoted support with an associated slide bush is provided. The slide bushes are engaged with a lower and upper slide bar which are integral with a door leaf. These engagements form a first and a third backup point for the door. A bracket at a front edge of the door forms a second backup point. The first, second and third backup point provide a robust and heavy structure for carrying the door leaf.

To obtain a sufficient robust device, the structure of the device is sized accordingly. However, a problem of this known device is that it requires too much of a built-in space which is commonly not or hardly available. In designing a passenger vehicle, a vehicle designer determines an environment which is available for a door system supplier in which the sliding door system has to fit. A built-in space at a chassis surrounding the door leaf is often very narrow which requires a challenging slim design of the sliding door system. In practise, this known device with its robust and voluminous spatial components often does not fit.

US2008/231083 discloses a door system with a door leaf to close off an entrance opening of a bus. For bringing the door leaf from a closed position to an open position, the door system has a displacement system which comprises a movable organ. At a leading edge of the door leaf, this movable organ is fixed to the door leaf via a supporting arm. The movable organ is movable along a rotatable rod mounted to a framework above the door leaf. Via the movable organ, the door leaf is suspended from a first suspension point and a second suspension point.

A wheel is provided at a rod end at the second suspension point to allow a rotational movement of the rod. The rotation of the rod around the first suspension point is determined by a track system which comprises a guiding strip with an curved end. Two running wheels are located at each side of the guiding strip and are connected via V-shaped levers to a turning rod. The running wheels are located playfree at opposite sides of the guiding strip, and the rotation axes are substantially located in line with the rotational axes of the turning rod.

A challenge regarding this known door system is to improve its robustness while being restricted to a narrow build-in space.

Many alternative embodiments of sliding door systems are known. It is desirable to provide a configuration of a sliding door system which is robust and compact at the same time to fit in a narrow built-in space.

Regarding the above-mentioned prior art, it is remarked that any discussion of documents, acts, materials, devices, articles or the like included in the present specification is for the purpose of providing a context for the present invention, and is not to be taken as an admission that any such matters form part of the prior art or were before the priority date of each claim of this application common general knowledge in the field relevant to the present invention.

The general object of the present invention is to at least partially eliminate the above mentioned drawback and/or to provide a usable alternative. More specific, it is an object of the invention to provide a sliding door system having a robust structure, wherein the structure still fits in a narrow built-in space.

SUMMARY OF THE INVENTION

This object is achieved by a sliding door system according to the invention.

The sliding door system comprises a framework and at least one door leaf having a front edge and a rear edge. The door leaf is displaceable in a transversal direction relative to the framework. The door leaf is displaceable by a sliding motion from a closed position to an open position to provide a doorway in the framework. In particular, the sliding door system is a passenger vehicle sliding door system for a public-transport vehicle. The vehicle passenger sliding door system has at least one door leaf displaceable by a sliding motion relative to the framework to provide a doorway for a passenger for entering a vehicle.

The at least one door leaf is suspended from the framework by a support guidance. The support guidance is arranged to guide the at least one door leaf along the framework. Framework means here a fixed surrounding around the door leaf for suspending the door leaf. The framework may be formed at least partially by a vehicle chassis.

The support guidance comprises a swing shaft including at least one swing arm. The swing shaft is swingable about a swing axis. The swing axis is positioned at a side of the doorway. In particular, the swing shaft comprises an upper swing arm positioned at an upper region of the door leaf and a lower swing arm positioned at a lower region of the door leaf. The door leaf is connected to a distal end of the swing arm to enable a plug out motion of the door leaf with respect to the framework.

The support guidance comprises a slide bar. The slide bar extends in the transversal direction of the door leaf. The slide bar is mounted to the door leaf. Preferably, the slide bar has a straight bar body. More preferably, the slide bar is a straight bar which is straight about a total bar length. Advantageously, the slide bar may be manufactured from straight rod material.

The support guidance comprises a sliding carriage. The sliding carriage is slidably mounted to the slide bar. In particular, the sliding carriage is movable along the straight bar body for opening and closing the door leaf by a rectilinear motion along the slide bar. The sliding carriage operates with a rectilinear motion along the straight bar body. The sliding carriage is pivotally connected about a carriage pivot axis to the distal end of the swing arm.

Further, the sliding door system comprises a steer guidance for steering the sliding motion of the door leaf. The steer guidance includes a steering track. The steering track extends in the transversal direction. Preferably, the steering track has a straight track body for opening and closing the door leaf by a rectilinear motion along the steering track. More preferably, the steering track is straight about a total track length. Advantageously, the steering track may be manufactured from straight rod material. The front edge of the door leaf is coupled to the steering track by a front lever. The front lever is mounted to the door leaf nearby the front edge.

According to the invention, an improvement is obtained by providing a fixed mounting of the steering track to the framework. The steering track is immovably mounted to the framework. The steering track has a fixed position. The steering track is arranged separate from movable components which form the support guidance for suspending the door leaf. In comparison with the prior art system, the steering track according to the invention is immovably fixed to the framework and mechanically seen independent and no longer part of the support guidance formed by an operable assembly of the swing shaft with the swing arm coupled with the slide bar by the sliding carriage. This independent mounting of the steering track allows an increase of a rigidity of the suspension of the door leaf formed by the support guidance and at the same time a modification of a configuration of other remaining components of the sliding door system. These remaining components may have a more compact design as a possible reduction in their rigidity can be compensated by an increased rigidity of the movable components forming the support guidance. Herewith, a compactness of a certain part of the structure can be increased which beneficially allows the sliding door system to fit within an available narrow built-in space at certain places of the framework around the door leaf.

This provided design freedom is especially beneficial for a sliding door system supplier who has to supply to a chassis builder in which the chassis design limits a possible configuration of a sliding door system. The compact configuration of the sliding door system according to the invention allows the supplier to comply with the requirements set by a bus car builder.

In addition, the sliding door system according to the invention may provide further advantages. The fixation of the steering track allows for example to obtain a stabile and accurate angular end position of the door leaf when the door leaf is placed in the open position. Especially, in a passenger vehicle, this stabile and accurate angular end positioning of the door leaf is beneficial in preventing an interference with a steered front wheel or nearby chassis components, like a mirror assembly of a bus car.

The fixed steering track may provide an increase in rigidity of the door leaf suspension. In several aspects according to the invention, a robustness and rigidity of the support guidance of the sliding door system may be further increased. Structural features provided by these aspects can be applied in isolation or in combination in an embodiment according to the invention to increase a rigidity of a door leaf suspension by the support guidance. In particular, the sliding door system according to the invention can be improved by increasing a rigidity of the support guidance by one or more of the features as described further herein. According to some aspects of the invention, structural improvements of the sliding door system can be obtained by improving a rigidity of a connection of the door leaf to the swing shaft.

In a first aspect, an arrangement of the slide bar can be improved to increase a rigidity of the connection of the door leaf of the sliding door system.

In an embodiment of the sliding door system according to the invention, the slide bar is positioned within a plane formed by a door leaf frame. The door leaf may be formed by a window frame including vertical frame profiles at the front and rear edge of the door leaf, in which the slide bar is fixedly mounted in between the vertical frame profiles. The slide bar may be positioned in between a front frame profile and a rear frame profile of the door leaf. By positioning the slide bar in the plane formed by the door leaf frame, a point of gravity of the door leaf may when seen in a vertical plane coincide or be close positioned to the axial axis of the slide bar, such that an introduction of a momentum of the door leaf with respect to the slide bar is minimised. An offset of a point of gravity of the door leaf with respect to the slide bar is minimised. Minimising the momentum allows a less demanding structure of a complementary rotational constraint below the slide bar. Herewith, the robust slide bar forms a main component in determining a rigidity of the structure. Remaining components can then be configured less robust which is beneficial in providing a sliding door system which has to fit in a narrow built-in space.

In an embodiment of the sliding door system according to the invention, the door leaf comprises only a single slide bar for carrying the door leaf. The slide bar may be connected at only its slide bar ends to the door leaf. Preferably, the slide bar has a circular cross-section. This circular cross-section provides a rotational degree of freedom to the door leaf about an axial axis of the slide bar. In particular, the slide bar has a diameter of at least 15 mm.

Preferably, the slide bar is positioned at an upper region of the door leaf. Herewith, a weight of the door leaf is hanging at the slide bar. The rotational degree of freedom of the door leaf about the axial axis of the slide bar is then constrained at a position below the slide bar. Preferably, a rotational constraint is provided at a lower region of the door leaf.

In an embodiment, only a single rotational constraint is provided at a region of the door leaf below the slide bar. The rotational constraint below the slide bar allows the sliding motion of the door leaf, but defines a rotational position of the door leaf about the axial axis of the slide bar. Preferably, the rotational constraint is positioned at the rear edge of the door leaf. The rotational constraint may be formed by a door leaf connection to a distal end of a lower positioned swing arm of the swing shaft. The door leaf connection may e.g. be formed by a U-shaped track mounted to the door leaf and engaged by a track follower, a track wheel, mounted to the lower positioned swing arm. The U-shaped track allows a sliding motion of the door leaf, but constraints a rotational degree of freedom in two rotational directions. Herewith, advantageously, a statical determination of the door leaf in rotation about the axial axis of the slide bar is obtained.

In a second aspect of the invention, the sliding carriage of the support guidance is improved to increase a rigidity of the connection of the door leaf of the sliding door system.

In an embodiment of the sliding door system according to the invention, the sliding carriage has a block-shaped carriage housing. The carriage housing houses a first and second roller pair to engage the slide bar. The carriage housing is oriented in a substantial vertical plane, such that the slide bar is supported by the lower positioned rollers of the sliding carriage. Upper positioned rollers rest on top of the slide bar. The first roller pair is positioned aside the second roller pair. In comparison with a sliding bush, the arrangement of roller pairs contributes to increase a rigidity.

Preferably, the first roller pair is positioned at a distance of at least 5 cm, preferably at least 8 cm, from the second roller pair. Herewith, the sliding carriage is arranged to carry a main portion of a weight and introduced momentum of the door leaf. Advantageously, the robust configuration of the sliding carriage allows to configure other components of the sliding door system more compact, such that the sliding door system may fit better in an available built-in space.

Preferably, the carriage pivot axis is positioned in between the first and second roller pair. The carriage pivot axis extends through the carriage housing in between the first and second roller pair. Herewith, a gravity load of the door leaf is transmitted from the sliding carriage to the swing arm over a relative short distance and off set, such that an introduction of a momentum is reduced.

In a third aspect of the invention, the swing arm of the support guidance is improved. The swing arm has a configuration which contributes to an increase of rigidity of the connection of the door leaf to the door sliding system.

In an embodiment of the sliding door system according to the invention, the swing arm which is pivotally connected to the sliding carriage comprises a first and second swing arm lever. Preferably, the carriage housing is sandwiched in between the first and the second swing arm lever. The first and second swing arm lever together with the carriage housing in between them form a box-structure which increases a rigidity of the swing arm. Preferably, at least one spacer support is positioned in between the first and second swing arm lever to further increase the rigidity of the swing arm. The at least one spacer support may be provided by a bush-shaped or plate-shaped lever member which may e.g. be welded or glued in between the first and second swing arm lever.

Herewith, according to the aspects of the invention, a mechanical chain of connections of the door leaf to the swing shaft can be improved by increasing a rigidity at this position of connection. The connection can be made more robust by adapting at least any of the slide bar, the sliding carriage and the swing arm, such that a substantial support of the door leaf is provided by this mechanical chain of connections. Remaining components of the sliding door system, in particular the front lever and the steering track of the steer guidance, but also components at a lower region of the door leaf can be configured less robust. These components can be configured in a compact manner, such that they require less built-in space in the surroundings of the door leaf. The configuration according to the invention is beneficial in vehicle design in that the main components forming the door leaf suspension is situated close to the swing shaft where there is generally sufficient space available for placement of the robust components. It is remarked that the swing shaft preferably extends along substantially the whole length of the door leaf. The swing shaft may extend from a lower region to an upper region of the door leaf. However, the swing shaft may also be a short swing shaft which is only locally provided at an upper or lower region of the door leaf. The swing shaft may be sandwiched in between the first and second swing arm lever.

In an embodiment of the sliding door system according to the invention, the front edge of the door leaf is connected to the steering track by a horizontally oriented plate shaped front lever body. The front lever body has a front lever base which is mounted to the door leaf. The front lever body extends from the base. The front lever body interconnects the door leaf and the steering track. Preferably, a track follower is connected at a free end of the front lever body. In particular, the track follower is a track wheel.

In an embodiment of the sliding door system according to the invention, the track follower comprises a horizontally oriented track wheel. The track wheel engages with the steering track to steer an angular position of the door leaf about a vertical axis. The steer guidance may be arranged by comprising only the horizontally oriented track wheel in engagement with the steering track, which may provide a lightweight structure requiring a minimum of built-in space. In a further embodiment, the track follower may further comprise a vertically oriented track wheel engaging the steering track. The vertically oriented track wheel may provide an auxiliary support to the door leaf in addition to the main support provided by the connection of the door leaf at the swing shaft.

In an embodiment of the sliding door system according to the invention, the sliding door system may further comprise a plug guidance for generating a plug motion of the door leaf. The plug motion includes a rotation of the door leaf about a vertical axis. The plug guidance serves to unplug the door leaf out of the closed position. In the closed position, the door leaf is aligned with a plane formed by the framework. When unplugging the door leaf, an unplug motion of the door leaf is made in which the door leaf is rotated about a vertical axis to move a rear edge of the door leaf out of the plane formed by the framework.

The plug guidance comprises a plug track and a plug wheel. The plug track is mounted to the door leaf. The plug track extends in a transversal direction of the door leaf in parallel with the slide bar. The swing arm is provided with the plug wheel which is in engagement with the plug track. The plug wheel is connected to a distal end of the swing arm. The plug track is connected to the door leaf. The plug track has an unplug cam profile in alignment with a linear cam profile. The unplug cam profile may form a heading portion of the plug track. Preferably, the plug track has a straight plug track body. More preferably, the plug track is straight about a total plug track length, such that the plug track can be manufactured from straight rod material. During a rotation of the swing shaft, the plug wheel follows the unplug cam profile, such that the door leaf is pressed out of the plane formed by the framework. When moving the door leaf from the open position to the closed position, in the same manner, the assembly of the plug track and plug wheel causes the door leaf to plug back into the framework. An unplug and plug motion is caused by a rotation of the swing shaft. Herewith, the sliding door system is a plug and slide door system. Advantageously, all guidance elements may be linear, i.e. the slide bar, the steering track and the plug track may be manufactured from straight rod material. No curvatures of rod material are necessary.

Thus, a sliding door system is provided comprising a support guidance for suspending a door leaf with respect to a framework. A steering track is fixed to the framework and an engaging front lever is mounted at a front edge of the door leaf. The support guidance is arranged independent from a steer guidance which provides a design freedom in which a rigidity of the support guidance can be increased independent from the steer guidance. The steer guidance can be designed with a compact configuration. A mechanical chain of connections of the door leaf to the swing shaft can be made more robust by adapting at least one of a slide bar, a sliding carriage and a swing arm, such that a substantial support of the door leaf is provided by this mechanical chain of connections.

Further, the invention relates to a vehicle, in particular a transport vehicle, more in particular a mass transit vehicle, like a bus or a railway vehicle comprising a sliding door system according to the invention. The vehicle may comprise a sliding door system including a single-door leaf or a double-door leaf assembly for opening and closing the doorway in the framework.

BRIEF DESCRIPTION OF THE DRAWINGS

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

DETAILED DESCRIPTION

Figure 1:
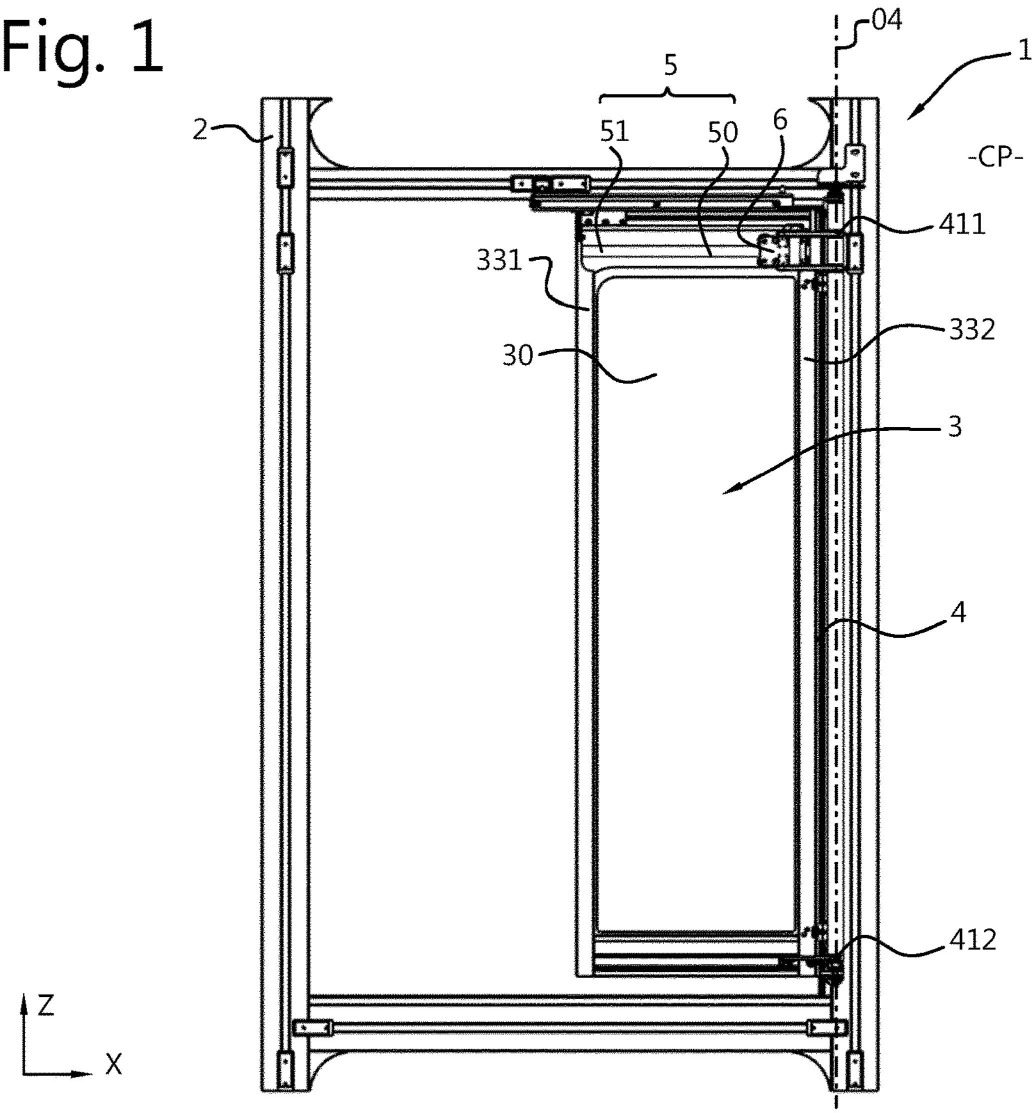
FIG. 1 shows a front view of a preferred embodiment of a sliding door system according to the invention.
Figure 2:
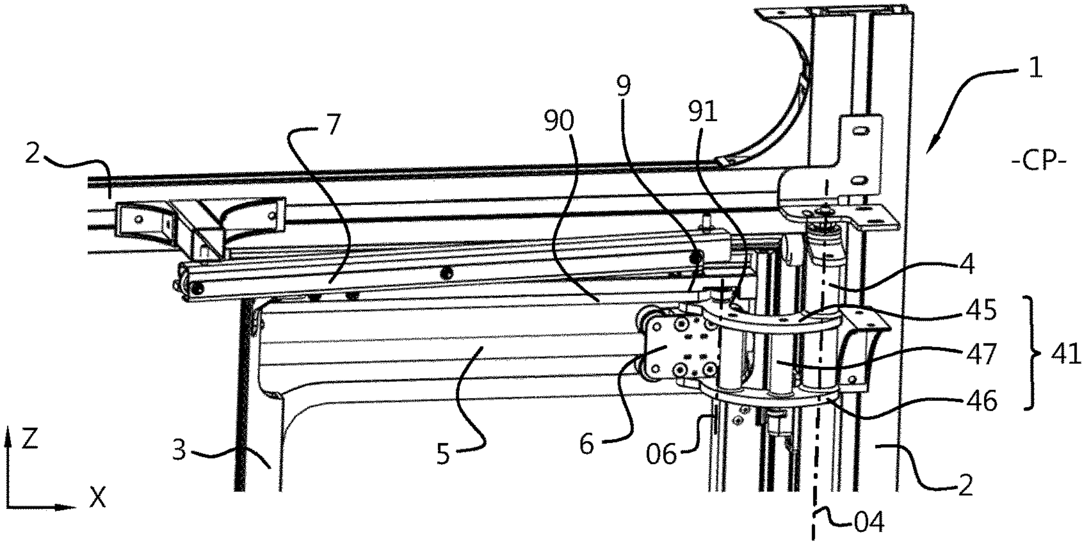
FIGS. 2-5 show an enlarged view under several viewing angles of a rigid connection at an upper region of a door leaf which is formed by a slide bar engaged by a sliding carriage being sandwiched in between a lower and upper swing arm lever of a rotatable swing shaft.

In FIGS. 1-14, a sliding door system according to the invention is denoted overall by reference numeral 1. The sliding door system is a mass transit vehicle sliding door system arranged to open or close a doorway for passengers. A mass transit vehicle may be a railway train or a bus car.

Identical reference signs are used in the drawings to indicate identical or functionally similar components. To facilitate comprehension of the description and of the claims the words vertical, horizontal, longitudinal, cross-sectional and a coordinate system X, Y, Z shown in the drawings—with reference to gravity and common placement of the sliding door system in a vehicle—are used in a non-limiting way.

FIG. 1 and corresponding figures show a coordinate system including a X-, Y-, Z-axis. The Z-axis defines a height or vertical direction. The X- and Y-axis define a XY plane which is a horizontal plane, in which the X-direction defines a vehicle length direction in a longitudinal direction of the vehicle and the Y-direction defines a vehicle width direction of the vehicle. The X- and Z axis define a XZ-plane which is a vertical plane in length direction. The Y- and Z-axis define a YZ-plane which is a vertical plane in width direction.

Commonly, the sliding door system is positioned at a left or right side of a vehicle chassis, such that a door leaf is placed in the vertical XZ-plane of the vehicle. A width of the door leaf is then measured in the length direction of the vehicle. Hence, a transversal direction of the door leaf is considered in the X-direction. A thickness of the door leaf is considered in the Y direction. A height of the door leaf is considered in the Z-direction.

FIG. 1 shows the sliding door system having a framework 2 and a door leaf 3. The door leaf is suspended from the framework 2. The door leaf is movable with respect to the framework 2 by a sliding motion from a closed position CP—as shown in FIG. 1-8—to an open position OP as shown in FIG. 9-14. The sliding motion is a movement of the door leaf 3 in the transversal direction, the X-direction. A drive system for driving the door leaf is not shown. Here, the sliding motion is combined with a plug motion. A plug/unplug motion is a rotational movement of the door leaf 3 about a vertical axis A-A to move the door leaf 3 respectively in or out the framework 2 in the Y-direction.

The framework to may be an item of the sliding door system itself. Generally, the framework 2 is at least partially formed by a chassis of a vehicle. In supplying the sliding door system for installation into the vehicle, an auxiliary framework, a so called cassette system, for holding components may be used to install the sliding door system 1 into the chassis of the vehicle.

The door leaf 3 has a door window 30 which is mounted to a door leaf frame 33, also called a window frame. The door leaf frame comprises a front frame profile 331 and a rear frame profile 332 which extends in a vertical direction. The front frame profile 331 forms a front edge or so called leading edge of the door leaf 3. The rear frame profile 332 forms a rear edge or so called trailing edge of the door leaf 3.

The door leaf 3 is suspended from the framework 2 by a support guidance 10. The support guidance 10 comprises several components which are further illustrated in FIG. 2.

The support guidance 10 comprises a swing shaft 4 which is pivotable about a vertical swing axis 04. The swing shaft 4 is provided with at least one swing arm 41. Here, an upper swing arm 411 is positioned at an upper region of the swing shaft 4 and a lower swing arm 412 is positioned at a lower region of the swing shaft. Each swing arm 41 has a free end which is connected to the door leaf.

The support guidance 10 comprises a slide bar 5. The slide bar 5 has a slide bar body 50 which has a circular cross-section. In particular, the slide bar has an outer diameter of at least 15 mm, in particular at least 20 mm. The slide bar 5 extends in a transversal direction and is mounted to the door leaf 3. The slide bar 5 has a straight bar body 50. Preferably, the slide bar 5 is a straight bar about a total bar length.

Here, at only both ends 51, 52, the slide bar is mounted to the door leaf. The slide bar 5 has an unmounted length bridging a distance of at least 50 cm between the front edge and the rear edge of the door leaf 3. The slide bar 5 forms part of the door leaf frame. The slide bar 5 is positioned in a plane formed by the door leaf frame. A first slide bar end 51 is mounted to the front frame profile 331 and a second slide bar end 52 is mounted to the rear frame profile 332.

The support guidance 10 comprises a sliding carriage 6. The sliding carriage is movable along the slide bar 5. The sliding carriage is movable along the straight bar body 50. The sliding carriage operates with a rectilinear motion along the straight bar body 50. The sliding carriage has a carriage housing 60 for housing a first roller pair 61 and a second roller pair 62. The first roller pair 61 is spaced at a distance of at least 5 cm, in particular at least 8 cm from the second roller pair 62. The carriage housing 60 is pivotally connected to the upper swing arm 411 about a carriage pivot axis 06. The carriage pivot axis 06 extends in parallel with the swing axis 04. Here, the carriage pivot axis 06 is positioned in between the first and second roller pair 61, 62. The carriage pivot axis 06 extends through the carriage housing.

Figure 3:
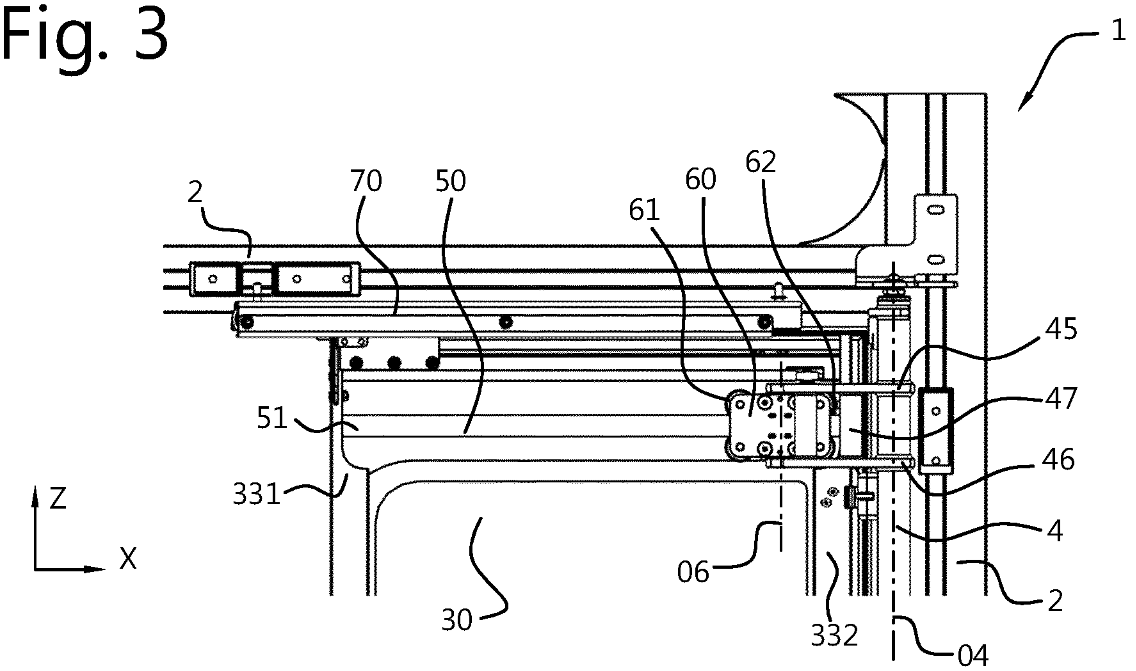
Figure 4:
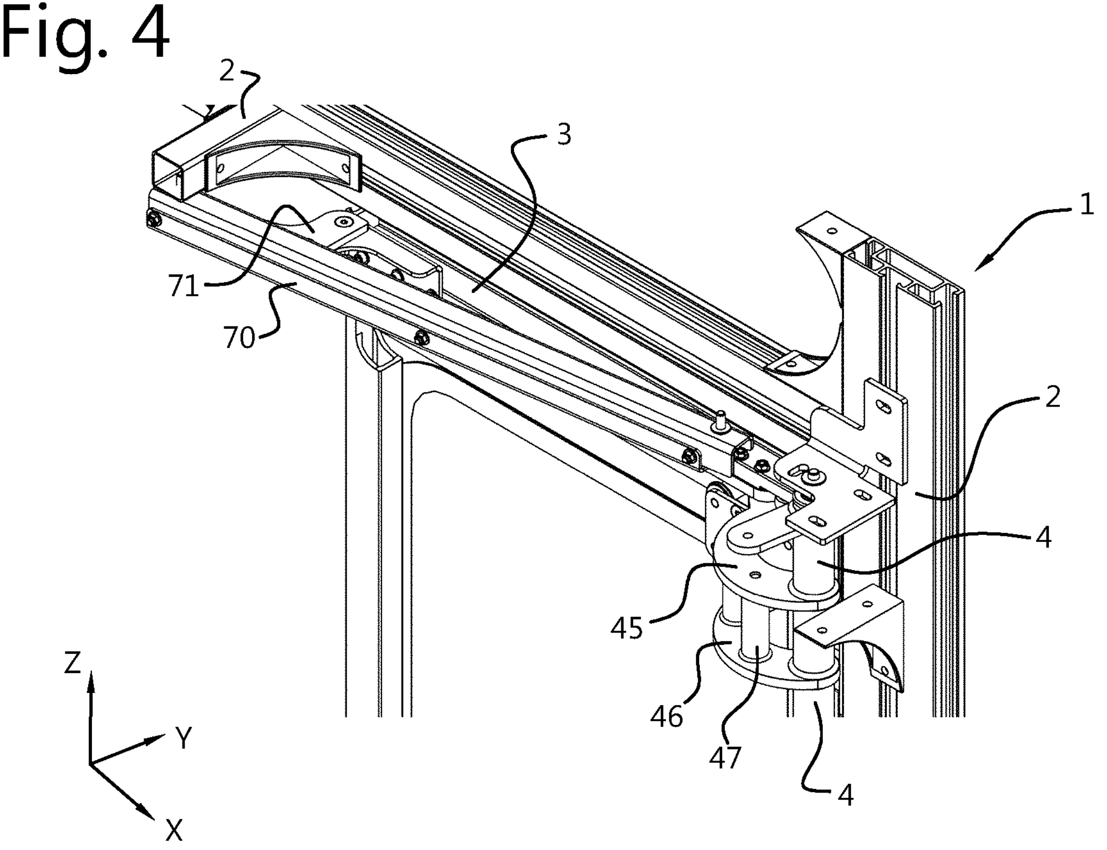
Figure 5:
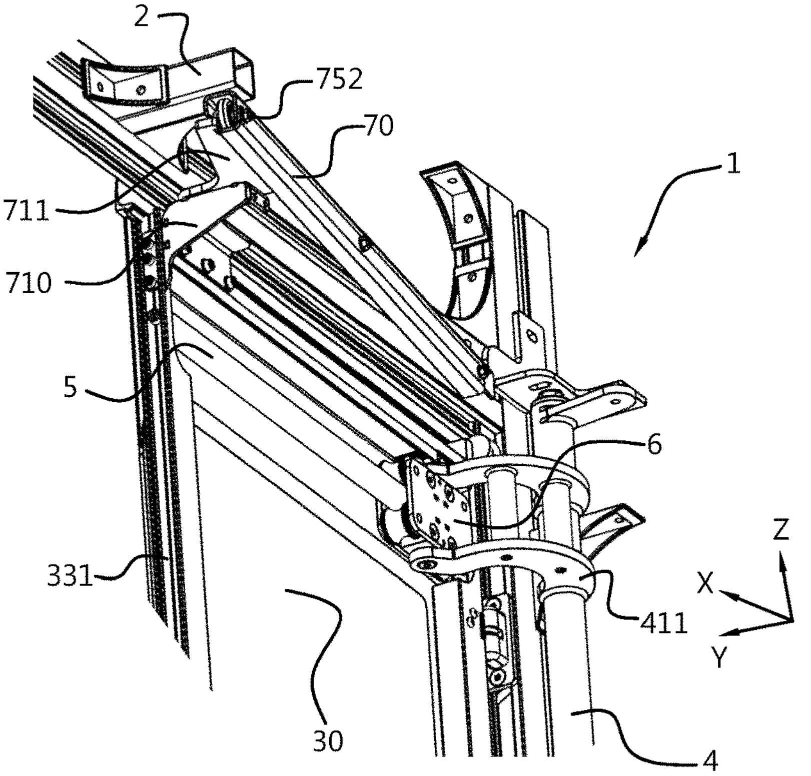
Figure 7:
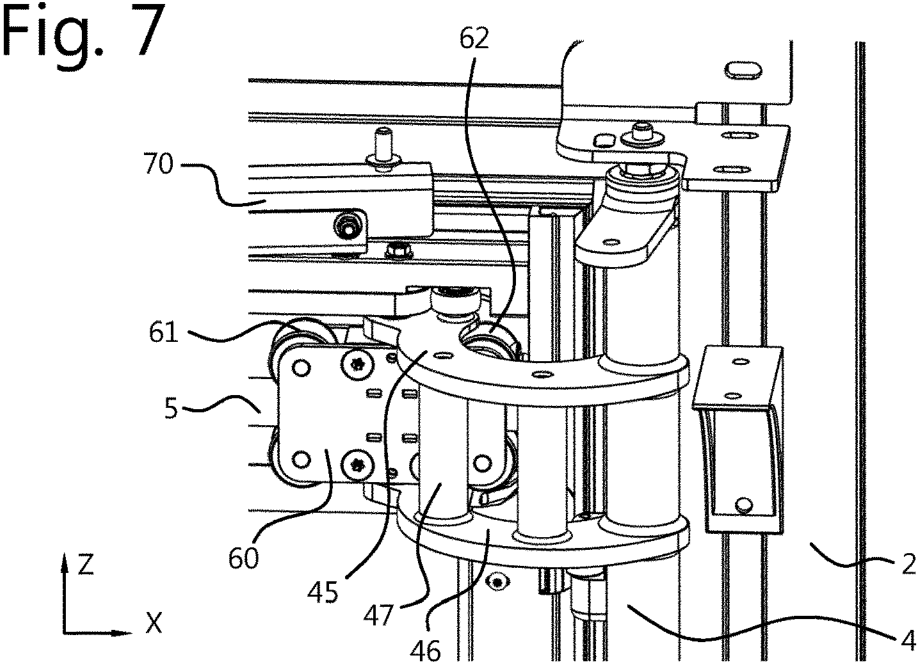
FIG. 7 shows in an enlarged view an embodiment of the rigid connection formed by a swing arm out of a pair of swing arm levers.

Here, as shown in FIGS. 3, 5 and 7, the carriage housing 60 is sandwiched in between a first swing arm lever 45 and a second swing arm lever 46. The carriage housing 60 together with the swing arm levers 45, 46 form a spatial arrangement of the swing arm 41 which contributes to its rigidity. At least one spacer support 47 is positioned in between the first and second swing arm lever 45, 46. Here, the at least one spacer support 47 is bush-shaped. Preferably, the spacer support is welded in between the first and second swing arm lever 45, 46. The interconnection by the spacer support 47 further increases a rigidity of the swing arm 41.

Thus, the door leaf 3 is suspended to the framework 2 by the support guidance 10 which is formed by a mechanical chain of connections of the swing shaft 4, the connected sliding carriage 6 and slide bar 5. These components 4, 5 and 6 of the structure have a robust configuration. A weight of the door leaf 3 is substantially carried by these components. A structure of other components can be down sized.

Figure 6:
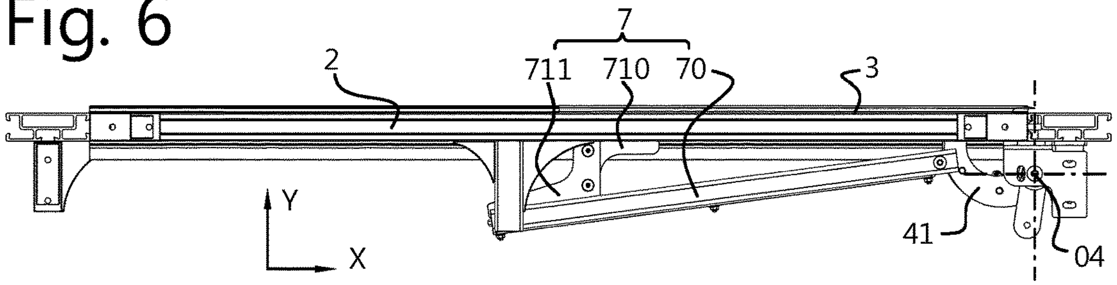
FIG. 6 shows a top view of the sliding door system of FIG. 1 in which a door leaf is held in a closed position within a framework.

As further shown in the top view of FIG. 6, to obtain a proper motion of the door leaf 3 with respect to the framework 2, the sliding door system further comprises a steer guidance 7. The steer guidance 7 includes a steering track 70. In particular, the steering track is a linear steering track. The steering track 70 is immovably mounted to the framework 2. The steering track 70 is fixed to the framework 2. The door leaf 3 is connected with the steering track 70 by a front lever 71. The front lever 71 is mounted at the front edge 31 of the door leaf 3 and in engagement with the steering track 70 by a track follower 75.

Here, the track follower 75 comprises a track wheel 751. The track wheel is oriented in the XY-plane, the horizontal plane. The horizontally oriented track wheel 751 is in engagement with the steering track 70, such that an angular position of the door leaf 3 about a vertical axis is determined.

The suspension of the door leaf 3 may be fully carried out by the sliding carriage 6. Here, an auxiliary track wheel 752 is connected with the front lever 71 to allow the steering track 70 to provide some further support to the door leaf which is especially beneficial in an extreme position of the door leaf, in particular in a position of the door leaf 3 nearby the closed position CP. As a load of the door leaf mainly acts at the support guidance situated at the swing shaft, the front lever 71 at the front edge 31 of the door leaf can have a reduced dimension in height direction.

Figure 8:
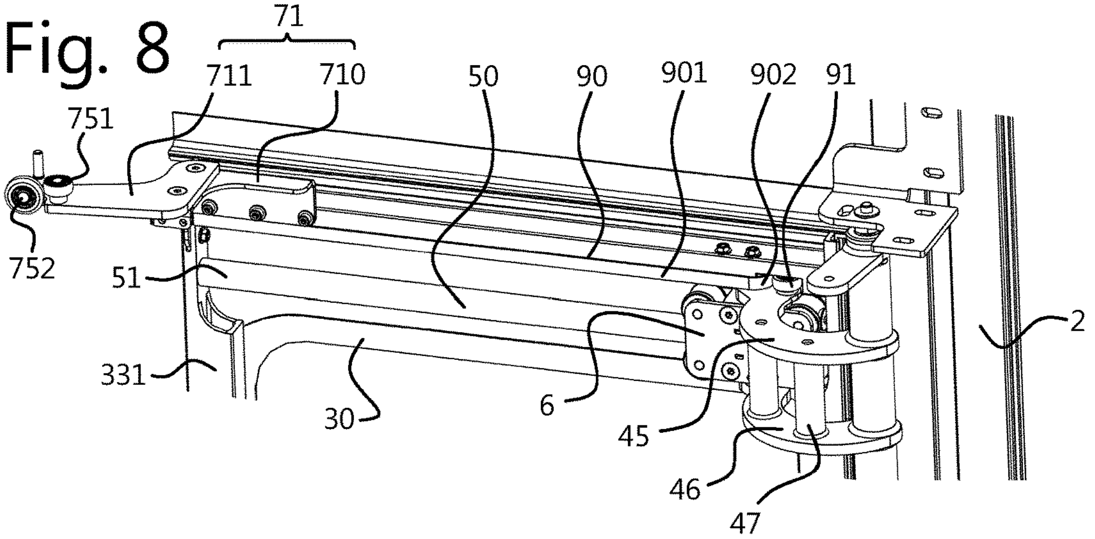
FIG. 8 shows in a perspective view a steer guidance formed by a front lever mounted at a front edge of the door leaf which front lever has a track follower which is in engagement with a steering track.
Figure 9:
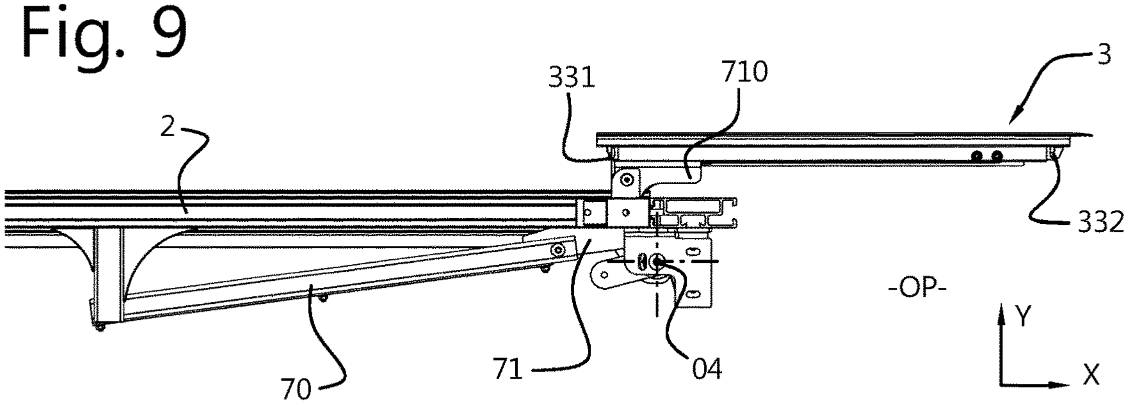
FIGS. 9-11 show the sliding door system in a top view in which the door leaf is in an open position.
Figure 10:
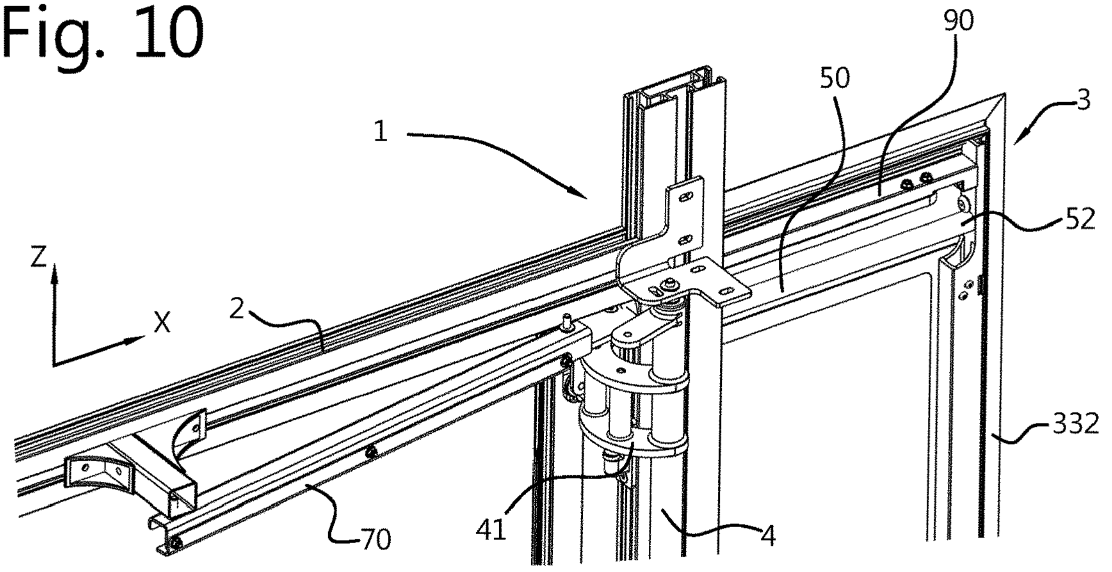
Figure 11:
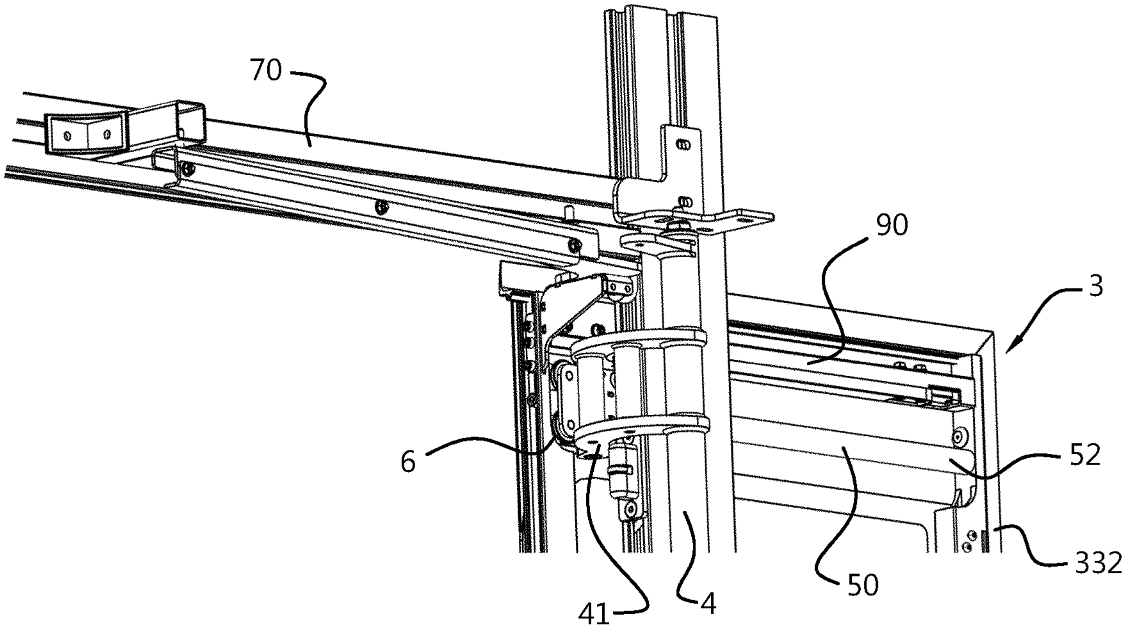

Here, as shown in FIG. 8, the front lever 71 has a front lever base 710 for mounting the front lever 71 to the door leaf 3 and a front lever body 711 extending away from the front lever base 710. The front lever base 710 is formed by an angled profile. The front lever body 711 is plate shaped and connected to the front lever base 710 body 711. The plate shaped front lever body 711 is oriented in the horizontal plane.

As shown in FIG. 8, the front lever body 711 has a free end. A track wheel 751 is positioned at the free end of the front lever body 711. The track wheel 751 is rotatable about a vertical axis and hence oriented in the horizontal plane to run along a vertically oriented track. An auxiliary track wheel 752 is positioned nearby the track wheel 751. The auxiliary track wheel 752 is oriented in the vertical plane (rotatable about a horizontal axis) to engage with a horizontally oriented track which may provide some additional support to the door leaf.

Figure 13:
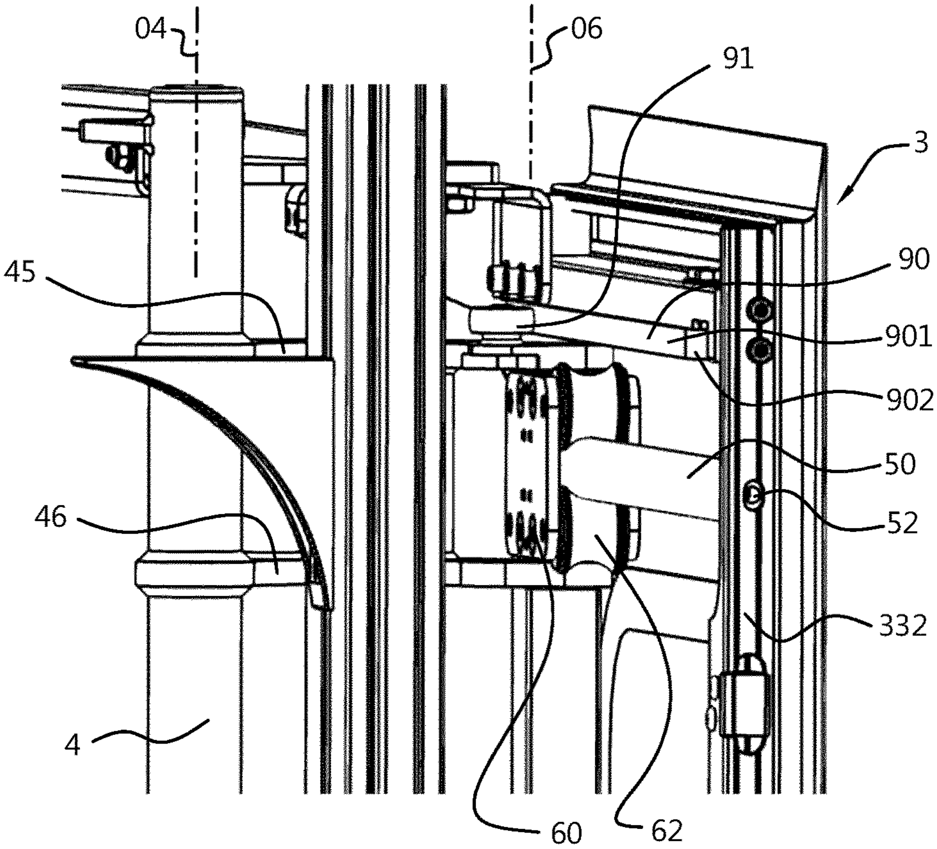
Figure 14:
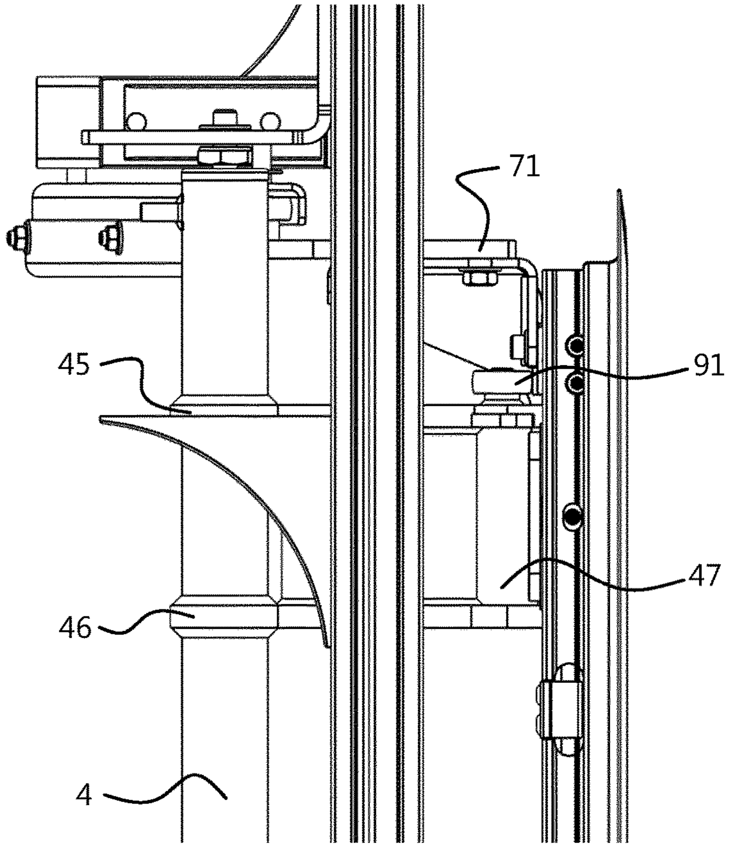

In particular FIGS. 8 and 13 show a plug guidance 9. The plug guidance 9 is formed by a plug track 90 which cooperates with a plug wheel 91. The plug track 90 has an elongated plug track body which is provided with a running track. The plug track 90 has a running track including a linear cam profile 901 and an unplug cam profile 902. The linear cam profile 901 extends along the elongated plug track body. The unplug cam profile 902 is situated at a heading portion of the plug track body. In the closed position of the door leaf, the plug wheel 91 is in engagement with the unplug cam profile 902. In an initial movement of the swing shaft 4, the plug wheel 91 runs along the unplug cam profile 902 causing the door leaf 3 to plug out from the framework 2. Subsequently, when the movement of the swing shaft 4 continuous and the door leaf has moved out sufficiently far, a sliding motion of the door leaf 3 can be started in which the plug wheel 91 runs along the linear cam profile 901 until the door leaf 3 is in the open position as shown in FIG. 13.

Figure 12:
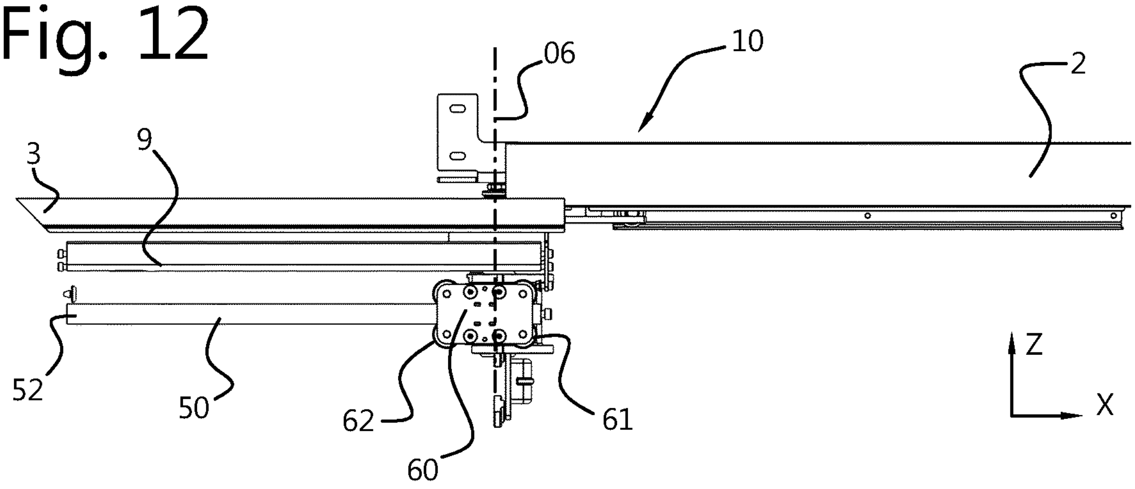
FIGS. 12-14 show a suspension of the door leaf in the open position in which the suspension is situated at the swing shaft and formed by the slide bar, the sliding carriage, the swing arm.

FIG. 12 shows a frontal view of the door leaf 3 in the open position seen from an outside. In the open position, the door leaf is carried at one side. The suspension of the door leaf is carried out by the support guidance 10 located at the swing shaft. The sliding carriage 6 is carrying the door leaf 3 by an engagement with the slide bar 50 which is part of the door leaf frame. A point of gravity of the door leaf 3 is located aside the sliding carriage 6. The first and second roller pair 61, 62 compensate for an introduced momentum in the XZ plane about a Y axis. In addition, the first and second roller pair 61, 62 which each has a concave running profile also compensate for a rotation about a Z axis.

Numerous variants are possible in addition to the embodiment shown in the figures. For example, in a variant of the illustrated embodiment of the sliding door system, an alternative embodiment of the sliding door system may comprise a second assembly of a connection by a slide bar, sliding carriage and swing arm at a lower region of the door leaf.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and claims.

Further, it is remarked that any feature of the sliding door system according to the invention which is described in the embodiments and/or mentioned in the dependent claims is in itself considered patentable without any dependency to another presented feature. In particular, any measure presented in a dependent claim is also considered patentable without dependency of the independent claim.

Thus, the invention provides a sliding door system comprising a support guidance for suspending a door leaf with respect to a framework, wherein the support guidance is formed by a slide bar, a sliding carriage, and a swing shaft with a swing arm, wherein a steer guidance is provided including a steering track fixed to the framework and an engaging front lever mounted at a front edge of the door leaf.

REFERENCE SIGNS LIST

CP closed position
OP open position
1 sliding door system
2 framework
3 door leaf
30 door window
31 front edge; leading edge
32 rear edge; trailing edge
33 door leaf frame; window frame
331 front frame profile
332 rear frame profile
10 support guidance
4 swing shaft
04 swing axis
41 swing arm
411 upper swing arm
412 lower swing arm
45 first swing arm lever
46 second swing arm lever
47 spacer support
5 slide bar
50 slide bar body
51 first slide bar end
52 second slide bar end
6 sliding carriage
06 carriage pivot axis
60 carriage housing
61 first roller pair
62 second roller pair
7 steer guidance
70 steering track
71 front lever
710 front lever base
711 front lever body
75 track follower
751 track wheel; horizontally oriented track wheel
752 auxiliary track wheel;
9 plug guidance
90 plug track
901 linear cam profile
902 unplug cam profile
91 plug wheel

The invention claimed is:

1. A vehicle sliding door system, for transport vehicles comprising a framework and at least one door leaf having a front edge and a rear edge, wherein the door leaf is displaceable relative to the framework by a sliding motion in a transversal direction of the door leaf from a closed position to an open position to provide a doorway in the framework and wherein the door leaf is suspended from the framework by a support guidance, and wherein the support guidance carries a substantial weight of the door leaf, wherein the support guidance comprises:

a swing shaft with a swing arm, wherein the swing shaft is swingable about a swing axis to enable a plug out motion of the door leaf with respect to the framework;

a slide bar which extends in the transversal direction of the door leaf and wherein the slide bar is mounted to the door leaf; and a sliding carriage slidably mounted to the slide bar and pivotally mounted about a carriage pivot axis connected to a distal end of the swing arm;

wherein the sliding door system further comprises a steer guidance, the steer guidance being configured to steer the sliding motion of the door leaf, wherein the steer guidance includes a steering track extending in the transversal direction and, wherein the the front edge of the door leaf is coupled to the steering track by a front lever, and wherein the steering track is fixedly mounted to the framework.

2. The vehicle sliding door system according to claim 1, wherein the slide bar is positioned within a plane formed by a door leaf frame.

3. The vehicle sliding door system according to claim 1, wherein the sliding door system comprises only a single slide bar for carrying the door leaf.

4. The vehicle sliding door system according to claim 1, wherein the sliding carriage has a carriage housing for housing a first and second roller pair, wherein the first and second roller pair are spaced at a distance of at least 5 cm from each other.

5. The vehicle sliding door system according to claim 4, wherein the carriage pivot axis extends through the carriage housing in between the first and second roller pair.

6. The vehicle sliding door system according to claim 1, wherein the swing arm comprises a first and second swing arm lever.

7. The vehicle sliding door system according to claim 6, wherein the carriage housing is sandwiched in between the first and second swing arm lever.

8. The vehicle sliding door system according to claim 6, wherein at least one spacer support is positioned in between the first and second swing arm lever.

9. The vehicle sliding door system according to claim 1, wherein the front edge of the door leaf is connected to the steering track by a plate shaped front lever body which is oriented in a horizontal plane.

10. The vehicle sliding door system according to claim 1, wherein a track follower for engagement with the steering track is positioned at a free end of a front lever body, wherein the track follower comprises a track wheel oriented in a horizontal plane for engagement with the steering track to steer an angular position of the door leaf about a vertical axis.

11. The vehicle sliding door system according to claim 1, wherein the sliding door system is a plug and sliding door system, in particular a passenger vehicle plug and sliding door system.

12. The vehicle sliding door system according to claim 1 further comprising a plug guidance for causing a plugging motion of the door leaf, wherein the plug guidance comprises a plug wheel in engagement with a plug track at the door leaf, wherein the plug track is provided with an unplug cam profile, and wherein the plug wheel is connected to a distal end of the swing arm.

13. The vehicle sliding door system according to claim 1, wherein the sliding door system is a single-leaf system or double-leaf system.

14. A transport vehicle comprising the vehicle sliding door system according to claim 1.

* * * * *